United States Patent [19]

Saito

[11] Patent Number: 4,509,085
[45] Date of Patent: Apr. 2, 1985

[54] EJECTING DEVICE OF A MAGNETIC TAPE DRIVING APPARATUS

[75] Inventor: Shoichi Saito, Tokyo, Japan

[73] Assignee: Olympus Optical Co., Ltd., Tokyo, Japan

[21] Appl. No.: 405,744

[22] Filed: Aug. 4, 1982

[30] Foreign Application Priority Data

Aug. 13, 1981 [JP] Japan .............................. 56-127068
Aug. 13, 1981 [JP] Japan .............................. 56-127069
Aug. 13, 1981 [JP] Japan .......................... 56-120365[U]

[51] Int. Cl.³ ...................... G11B 15/00; G11B 19/18
[52] U.S. Cl. ..................................... 360/93; 360/96.6
[58] Field of Search ...................... 360/93, 96.5, 96.6; 242/197–200

[56] References Cited

U.S. PATENT DOCUMENTS 4,320,424 3/1982 Murayama ................... 360/96.6 X
4,344,097 8/1982 Takai ............................ 360/96.6

Primary Examiner—John H. Wolff
Attorney, Agent, or Firm—Frishauf, Holtz, Goodman and Woodward

[57] ABSTRACT

An ejecting device which is used in a magnetic tape driving apparatus includes a first base plate extending parallel to the axes of reel shafts and at a right angle to a horizontal plane, a second base plate attached to the first base plate so as to be rotatable parallel to the first base plate between first and second positions, so that a lower portion of the second base plate below its axis of rotation relative to the first base plate is farther away from the projected ends of the reel shafts when the second base plate is located in the second position than when in the first position, a third base plate is rotatably attached to that portion of the second base plate below the axis of rotation of the second base plate relative to the first base plate, for rotation parallel to the second base plate. A tape cassette retaining member on the third base plate is provided for detachably holding the tape cassette, and a guide pin on the third base plate is fitted in a guide hole in the first base plate, so that the reel hubs of the tape cassette held by the tape cassette retaining member are mounted on the reel shafts when the second base plate is located in its first position, and the reel hubs of the tape cassette are disengaged from the reel shafts to tilt the axes of the reel hubs relative to the axes of the reel shafts while the second base plate moves from the first position to the second position.

6 Claims, 20 Drawing Figures

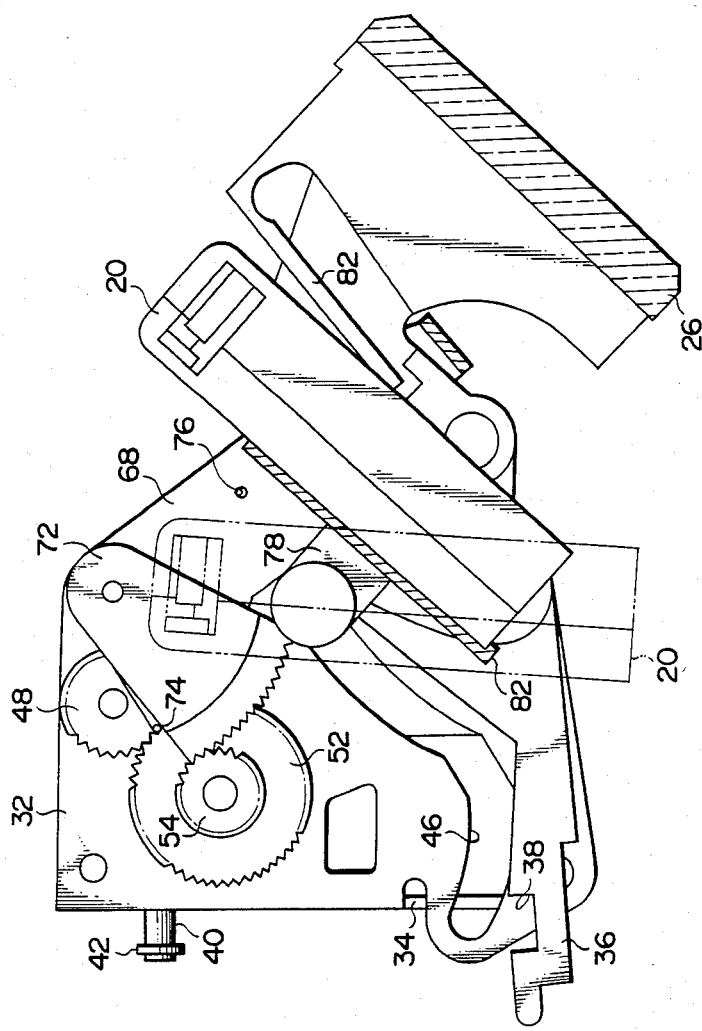

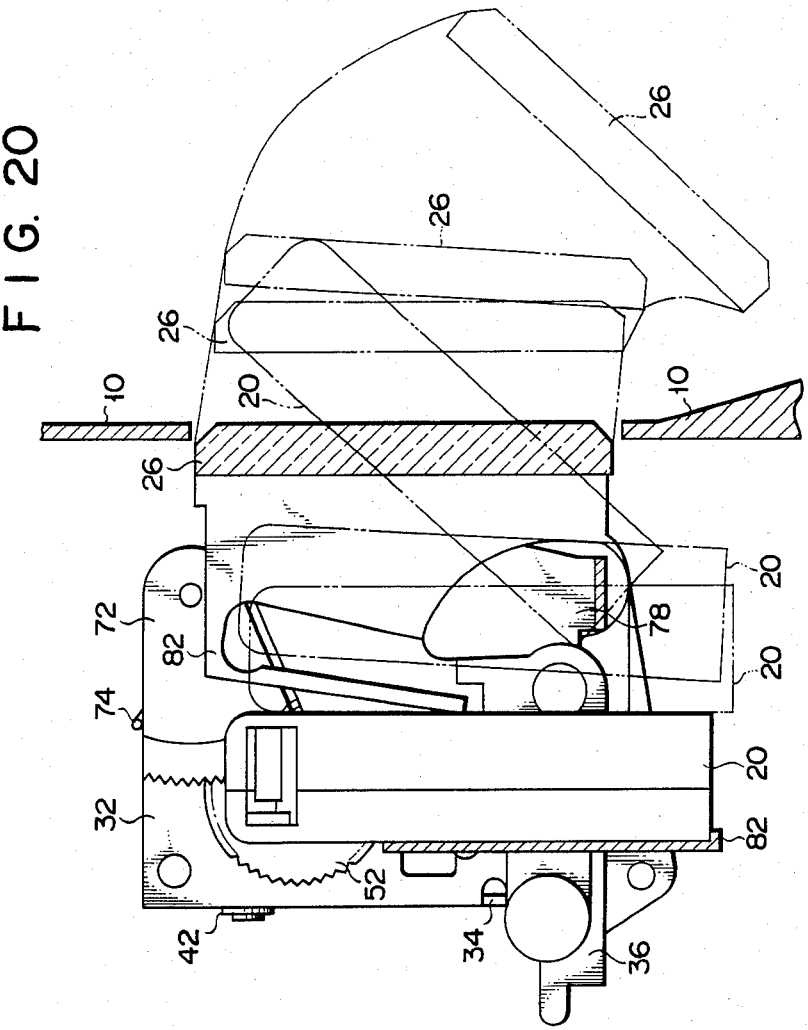

EJECTING DEVICE OF A MAGNETIC TAPE DRIVING APPARATUS

BACKGROUND OF THE INVENTION

This invention relates to an ejecting device of a magnetic tape driving apparatus using a tape cassette.

In a conventional ejecting device of this type, a tape cassette retaining means for detachably retaining a tape cassette is attached to a pantograph mechanism. The pantograph mechanism causes the tape cassette retaining means holding the tape cassette to move between first and second positions along the axes of the reel shafts of a magnetic tape driving apparatus.

In the ejecting device of this type, when the tape cassette retaining means is located in its first position, reel hubs of the tape cassette held by the tape cassette retaining means are mounted individually on the reel shafts of the magnetic tape driving apparatus. In this state, a faceplate attached to the tape cassette retaining means is located flush with the outer surface of the housing of the magnetic tape driving apparatus.

When the tape cassette retaining means is located in its second position, the reel hubs of the tape cassette held by the tape cassette retaining means are disengaged from the reel shafts. In this state, the faceplate is located outside and substantially parallel to the outer surface of the housing of the magnetic tape driving apparatus.

In a conventional ejecting device of another type, one end of a tape cassette retaining means is attached to the chassis of the magnetic tape driving apparatus so as to be swingable between first and second positions.

When the tape cassette retaining means is located in its first position, the reel hubs of the tape cassette held by the tape cassette retaining means are mounted individually on the reel shafts of the magnetic tape driving apparatus. In this state, the faceplace attached to the tape cassette retaining means is located flush with the outer surface of the housing of the magnetic tape driving apparatus.

When the tape cassette retaining means is located in its second position, the reel hubs of the tape cassette held by the tape cassette retaining means are disengaged from the reel shafts. In this state, the faceplate is inclined at an angle to the outer surface of the housing of the magnetic tape driving apparatus.

In the prior art ejecting devices of the aforementioned construction, the faceplate attached to the tape cassette retaining means to constitute part of the surface of the magnetic tape driving apparatus, must have an orthogonal projection area at least substantially equal to that of one of those surfaces of the housing of the tape cassette held by the tape cassette retaining means that support the reel hubs for rotation.

In the field of magnetic tape driving apparatuses in Japan, a tendency to thin the apparatuses has been seen lately, reflecting the housing situation of Japan. This tendency is especially marked with cassette decks of component-type stereos.

In a component-type stereo, a cassette deck and other components, such as an amplifier, tuner, record player, etc., are vertically stacked for economy of space. In the cassette deck used in this manner, when the tape cassette retaining means is located in its first position, the faceplate of the retaining means is located flush with the vertical face or front face of the housing of the cassette deck to facilitate visual check of variations in the diameter of a magnetic tape wound around the reel hubs of the tape cassette. Also, the aforesaid surfaces of the housing of the tape cassette held by the tape cassette retaining means are located parallel to the front face of the housing of the cassette deck.

Accordingly, if the cassette deck is thinned to such a degree that its height is substantially equal to the height of the tape cassette or the faceplate, that is, the distance from that surface of the tape cassete in which a magnetic head-pinch roller insertion window is formed to the surface opposite thereto, then the space for the arrangement of various operation switches for operating the magnetic tape driving apparatus on the front face of the housing of the cassette deck will be reduced.

To cope with this problem, the operation switches may be miniaturized, or arranged on the faceplate of the tape cassette retaining means.

The miniaturization of the operation switches might, however, lead to incorrect operation or awkward handling of the cassette deck.

The arrangement of the operation switches on the faceplate would cause frequent breaking of a cord or other suitable means for electrically connecting the operation switches and the magnetic tape driving apparatus, since the faceplate, along with the tape cassette retaining means, can move between the first and second positions thereof. Thus, the magnetic tape driving apparatus would be lowered in reliability.

SUMMARY OF THE INVENTION

This invention is contrived in consideration of the foregoing circumstances, and is intended to provide an ejecting device of a magnetic tape driving apparatus capable of improving the operating capability and reliability of various operation switches of the apparatus, as well as of thinning the apparatus.

The above objects of the invention may be attained by an ejecting device which is used in a magnetic tape driving apparatus comprising a rising surface intersecting a horizontal line, reel shafts whose axes intersect the rising surface, a magnetic tape driving mode setting switch movable between a first position where the reel shafts are stopped and a magnetic tape driving mode is cleared, and a second position where the reel shafts are rotated and the magnetic tape driving mode is established, and an ejection switch movable between first and second positions, and which can move between the first position where reel hubs of a tape cassette are mounted on the reel shafts, and a second position where the reel hubs are disengaged from the reel shafts, and is allowed to move from the first position to the second position as the ejection switch held in its first position is shifted to the second position, comprising a first base plate extending parallel to the axes of the reel shafts to intersect the horizontal line, a second base plate attached to the first base plate so as to be rotatable substantially parallel to the first base plate between first and second positions so that the lower portion of the second base plate below its axis of rotation relative to the first base plate is farther away from the projected ends of the reel shafts when the second base plate is located in its second position than when in the first position, a third base plate rotatably attached to that portion of the second base plate off the axis of rotation of the second base plate relative to the first base plate, and rotating substantially parallel to the second base plate, tape cassette retaining means on the third base plate for detachably holding the tape cassette, a guide pin on the third base plate, and a guide hole in the first base plate in which the guide pin is fitted, so that the reel hubs of the tape cassette held by the tape cassette retaining means are mounted on the reel shafts when the second base plate is located in the first position thereof, and that the reel hubs of the tape cassette held by the tape cassette retaining means are disengaged from the reel shafts to tilt the axes of the reel hubs relative to the axes of the reel shafts while the second base plate moves from its first position to the second position.

Preferably, the ejecting device of the invention further comprises an auxiliary retaining member movable between first and second positions thereof, the auxiliary retaining member holding the guide pin to keep the second base plate in its first position when the auxiliary retaining member is located in its first position, and releasing the hold of the guide pin to allow the second base plate to move from its first position to the second position when the auxiliary retaining member is located in the second position, and auxiliary retaining member operating means operated by the magnetic tape driving mode setting switch to shift the auxiliary retaining member between its first and second positions, so that the auxiliary retaining member is located in the first position when the magnetic tape driving mode setting switch is located in its second position, and that the auxiliary retaining member is located in the second position when the magnetic tape driving mode setting switch is located in its first position. In this ejecting device, the ejection switch includes a main retaining member for holding the guide pin to keep the second base plate in its first position when the main retaining member is located in a first position thereof, and releasing the hold of the guide pin to release the second base plate from locking to its first position when the main retaining member is located in a second position.

With this construc,tion, even if the ejection switch is located in its second position by mistake while the magnetic tape driving mode is established in the magnetic tape driving apparatus, the ejecting device cannot move from its first position, where the reel hubs of the tape cassette held thereby are mounted on the reel shaft, to its second position where the reel hubs are disengaged from the reel shafts. Accordingly, the rotating reel shafts are prevented from applying an excessive force to the housing of the tape cassette and the magnetic tape therein through the reel hubs. Thus, the housing of the tape cassette and the magnetic tape, along with the reel shafts, can be protected against damage, such as deformation.

Preferably, moreover, the ejecting device of the invention further comprises a toggle spring coupled with the ejection switch and the second base plate, to urge the ejection switch toward its first position as the second base plate is located in its first position and to urge the ejection switch toward the second position as the second base plate moves from the first position thereof to the second position, and electric circuit means for electrically preventing the magnetic tape driving mode from being established in the magnetic tape driving apparatus by the magnetic tape driving mode setting switch as the ejection switch is located in the second position.

With this construction, even if the magnetic tape driving mode setting switch is located in the second position by mistake while the ejecting device is moving between its first position where the reel hubs of the tape cassette held thereby are mounted on the reel shafts and its second position where the reel hubs are disengaged from the reel shafts, the reel shafts will never rotate. Accordingly, the reel shafts are prevented from hindering the movement of the ejecting device between its first and second positions, and from applying an excessive force to the housing of the tape cassette and the magnetic tape therein through the reel hubs. Thus, the housing of the tape cassette and the magnetic tape, along with the reel shafts, can be protected against deformation or other damage.

Preferably, in the ejecting device of the invention, the ejection switch includes a horizontal shifting member movable between first and second positions in a direction to intersect the rising surface along the first base plate, and located closer to the rising surface when in the second position thereof; the main retaining member is a lever having an engaging recess at one end to engage the guide pin, rotatably coupled with the horizontal shifting member at the other end, and rotatably attached at its middle portion to the first base plate, so that the lever is located in the first position as its horizontal shifting member is located in its first position, and makes an angular movement from the first position to be located in its second position as the horizontal shifting member is located in its second position, and the toggle spring is coupled with the other end of the lever as the main retaining member of the ejection switch and the second base plate of the ejecting device.

In this arrangement, the coupling mechanism for the ejecting device and the ejection switch can be simplified in construction.

In the ejecting device of the invention, furthermore, the auxiliary retaining member is preferably a lever rotatably attached at one end to the first base plate so as to be coaxial with the main retaining member, having an engaging recess at the other end to engage the guide pin, and making an angular movement between first and second positions.

In this arrangement, the auxiliary retaining member can be simplified in construction.

BRIEF DESCRIPTION OF THE DRAWINGS

FIG. 19 is a side view on the same side of FIG. 3 showing a state in which the tape cassette retaining means holding the tape cassette is attached to the ejecting device of FIG. 18; and FIG. 20 is a side view on the same side of FIG. 3 showing a locus of a faceplate and a plurality of states of the tape cassette obtained while the ejecting device is shifted from its first position to its second position.

DETAILED DESCRIPTION OF THE PREFERRED EMBODIMENT

Figure 1:
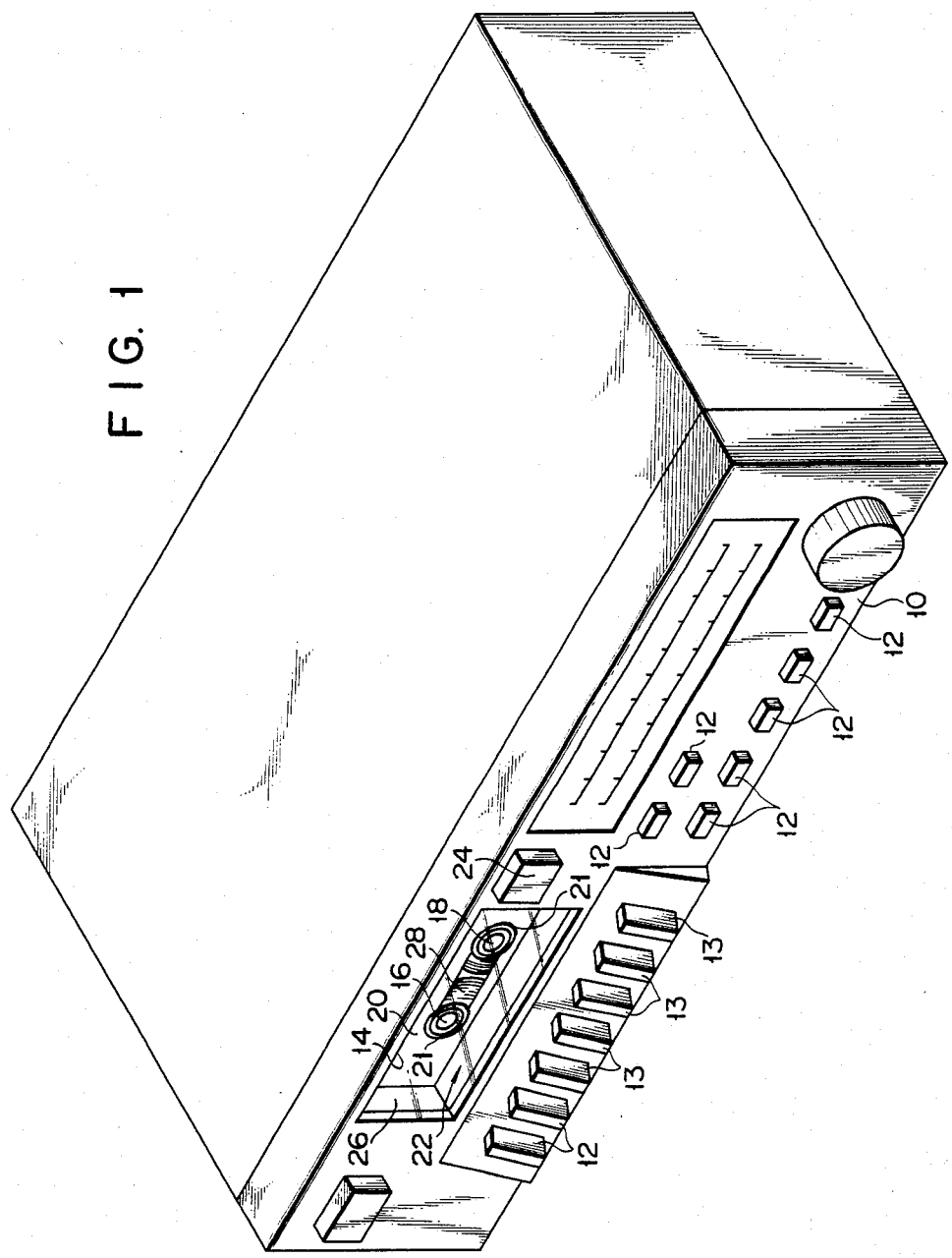
FIG. 1 Is a perspective view of a magnetic tape driving apparatus with an ejecting device according to an embodiment of this invention.

FIG. 1 shows a magnetic tape driving apparatus provided with an ejecting device according to an embodiment of this invention. In this embodiment, the magnetic tape driving apparatus is a cassette deck of a component-type stereo.

Arranged on a vertical front face of the housing of the magnetic tape driving apparatus are a plurality of operating switches 12 and 13 for establishing in the magnetic tape driving apparatus various operation modes, including fast-forward, fast rewinding, stop, cue, review, pause, and playback modes.

The operating switches 13 can move between a first position shown in FIG. 1 and a second position closer to the front face 10. In the second position, the operating switches 13 electrically act on the electric circuit of the magnetic tape driving apparatus to rotate reel shafts 16 and 18, thereby establishing in the apparatus a magnetic tape driving mode, such as the fast-forward, fast rewinding, cue, review, or playback mode. In the first position, the switches 13 cease to act on the circuit, and deactivate rotation of the reel shafts 16 and 18.

A tape cassette holding cavity 14 is also provided in the front face 10 of the housing.

Arranged in the tape cassette holding cavity 14, as shown in FIG. 1, are the pair of reel shafts 16 and 18 whose rotation axes extend at right angles to the front face 10.

A tape cassette 20 is held in the tape cassette holding cavity 14 so that a pair of reel hubs 21 of the tape cassette 20 are mounted individually on the reel shafts 16 and 18.

In this embodiment, the tape cassette 20 is a micro cassette, as it is called. The tape cassette 20 is detachably retained by an ejecting device 22 which is held in the holding cavity 14.

The ejecting device 22 can move between a first position where the reel hubs 21 of the tape cassette 20 are mounted on the reel shafts 16 and 18 in the tape cassette holding cavity 14, as shown in FIG. 1, and a second position where the reel hubs 21 are disengaged from the reel shafts 16 and 18 so that the tape cassette 20 is projected outward from the front face 10 of the magnetic tape driving apparatus.

The ejecting device 22 has an ejection switch 24 protruding outward from the front face 10 of the housing of the magnetic tape driving apparatus.

The ejecting device 22 also has a faceplate 26, which is located flush with the front face 10 of the housing when the ejecting device 22 is in the first position, as shown in FIG. 1. In this state, the faceplate 26 covers the opening of the tape cassette holding cavity 14 to form part of the front face 10. The faceplate 26 is arranged parallel to major faces of the housing of the tape cassette 20 which retain the pair of reel hubs 21 for rotation.

The longitudinal or vertical length of the faceplate 26 is shorter than the vertical length of the housing of the tape cassette 20 mounted on the reel shafts 16 and 18, that is, the distance from one surface of the housing on which a magnetic head-pinch roller insertion window is formed to another surface opposite thereto. Accordingly, even though the thickness or height of the apparatus is substantially equivalent to the vertical length or height of the housing of the tape cassette 20, it is possible to secure a space wide enough for the arrangement of the operating switches on the front face 10 of the housing of the magnetic tape driving apparatus. Despite the reduced thickness of the magnetic tape driving apparatus, therefore, the operating switches 13 can be made relatively large-sized without locating them on the faceplate 26. For example, the operating switches 13 may be arranged right under the faceplate 26, as shown in FIG. 1. The orthogonal projection of the operation switches 13 thus located overlaps the tape cassette 20 whose reel hubs 21 are mounted individually on the reel shafts 16 and 18 of the magnetic tape driving apparatus.

In this embodiment, the faceplate 26 is formed of a transparent plate. Therefore, the variation of the diameter of a magnetic tape 28 wound around each reel hub 21 of the tape cassette 20 can be monitored visually.

Figure 2:
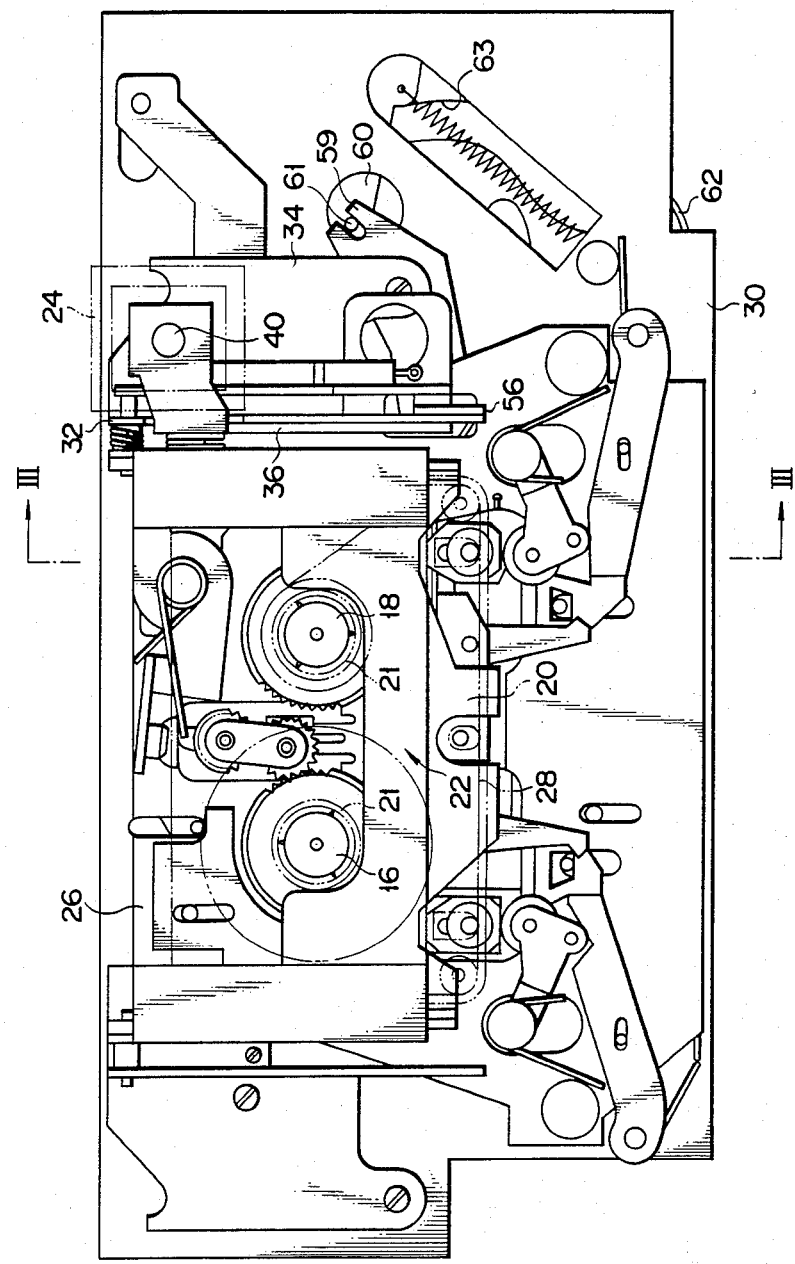
FIG. 2 is a front view of the interior of a housing of the magnetic tape driving apparatus.

FIG. 2 is a front view of the ejecting device 22 in the housing of the magnetic tape driving apparatus. Inside the housing, a chassis 30 is disposed substantially parallel to the front face 10 of the housing. The pair of reel shafts 16 and 18 protrude from the chassis 30.

The chassis 30 is fitted with the ejecting device 22 for detachably retaining the tape cassette 20.

Figure 3:
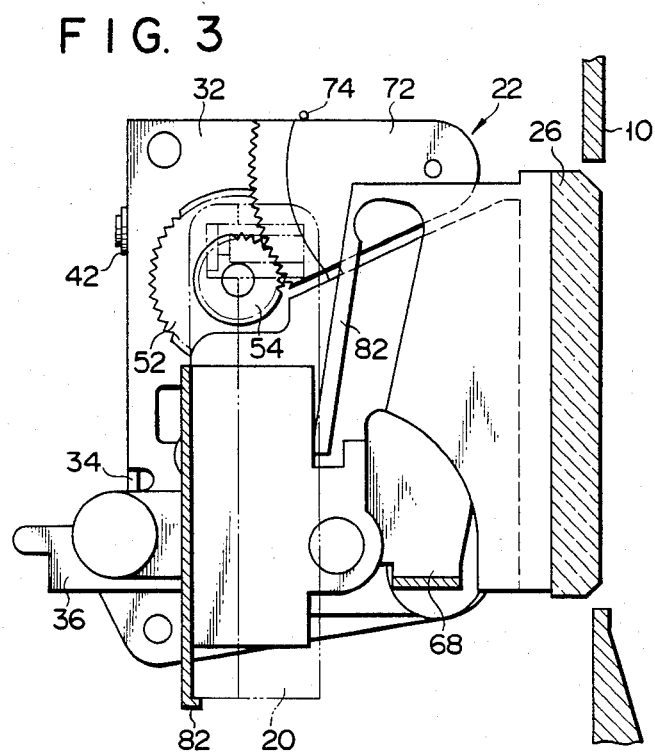
FIG. 3 is a side view of the ejecting device taken along line III—III of FIG. 2.

As shown in FIGS. 2 and 3, the ejecting device 22 has a first base plate 32 extending in a direction parallel to the axes of the reel shafts 16 and 18 and at right angles to a horizontal plane. A rear end portion 34 of the first base plate 32 is bent on one side to extend substantially parallel to the surface of the chassis 30, and is fixed thereto by conventional fixing means such as a screw.

Figure 4:
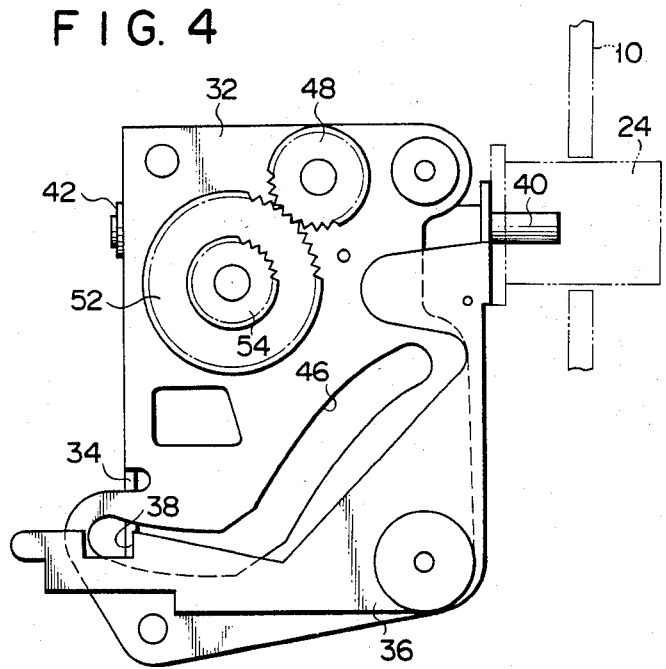
FIG. 4 is a side view on the same side of FIG. 3 showing a first base plate of the ejecting device and accessories thereof.

In this embodiment, the first base plate 32 has a substantially square profile, as shown in FIG. 4.

As shown in FIG. 4, the central portion of a main retaining member 36 formed of an inverted-L-shaped lever is rotatably attached to the lower front end portion of the other side of the first base plate 32. The main retaining member 36 can rotate parallel to the other side of the first base plate 32 around the central portion of the member 36.

The main retaining member 36 includes a section extending upward from the central portion along the front edge of the first base plate 32 to form one end of the member 36, and a section extending backward from the central portion along the lower edge of the first base plate 32 to form the other end. An engaging recess 38 is formed in the upper edge of the backwardly extending section. The upper end portion of the upwardly extending section is bent on one side of the first base plate 32 to face the rear end portion 34 of the first base plate 32.

Figure 5:
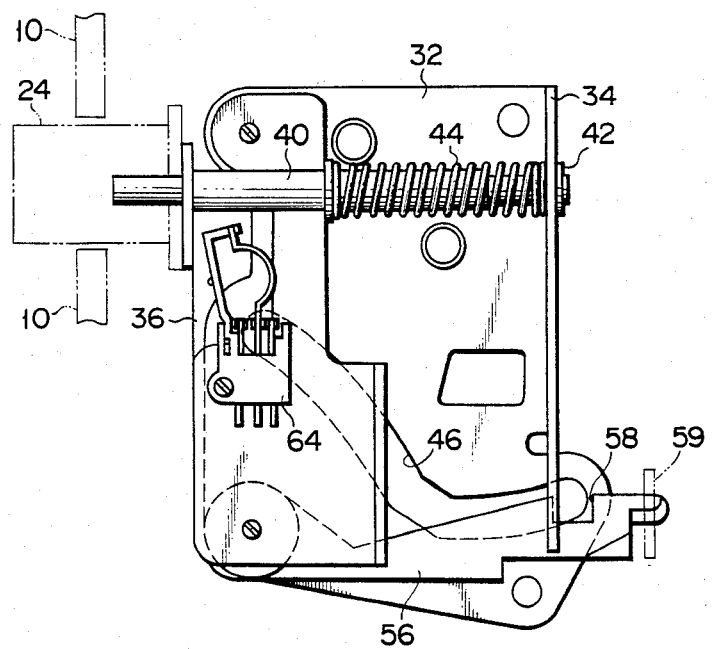
FIG. 5 is a side view on the opposite side to FIG. 3 showing the first base plate of the ejecting device and the accessories thereof.
Figure 6:
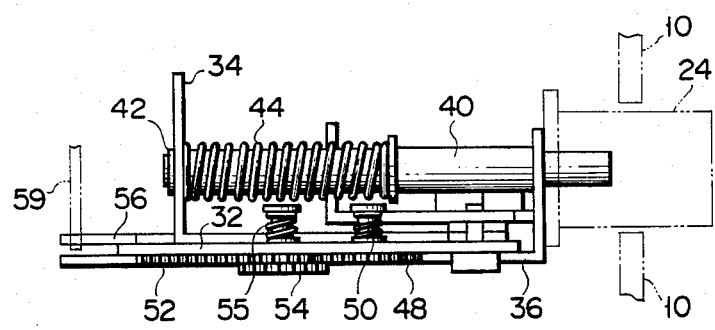
FIG. 6 is a top view of the ejecting device of FIG. 4.

As shown in FIGS. 5 and 6, a horizontal shifting member 40 in the form of a rod is passed through the rear end portion 34 of the first base plate 32 and the upper end portion of the upwardly extending section of the main retaining member 36. The horizontal shifting member 40 has a stopper 42 at the back of the rear end portion 34 of the first base plate 32.

The horizontal shifting member 40 is urged forward by the urging force of urging means 44.

The horizontal shifting member 40 has a stepped section reduced in diameter at the front end portion. The stepped section is located close to the rear face of the upper end portion of the upwardly extending section of the main retaining member 36.

The front end of the horizontal shifting member 40 and the front face of the upper end portion of the upwardly extending section of the main retaining member 36 are in contact with the ejection switch 24. The stopper 42 of the horizontal shifting member 40, urged forward by the urging means 44, is in contact with the back of the rear end portion 34 of the first base plate 32. The positions of the horizontal shifting member 40, the main retaining member 36, and the ejection switch 24 in this state are defined as their respective first positions.

As shown in detail in FIGS. 4 and 5, a guide hole 46 is formed in the first base plate 32. In FIG. 4, the guide hole 46 is substantially inverted-L-shaped. The upwardly extending section of the guide hole 46 is somewhat inclined forward. The rear end portion of the guide hole 46 overlies the engaging recess 38 of the main retaining member 36.

Above the guide hole 46, as shown in FIG. 4, a first gear 48 is rotatably mounted on the other side of the first base plate 32. As shown in FIG. 6, the first gear 48 is caused to abut against the other side of the first base plate 32 by the urging force of urging means 50 concentric with the first gear 48. Thus, the coefficient of friction at rotation is increased.

Above, the guide hole 46, as shown in FIG. 4, a second gear 52 is also rotatably mounted on the other side of the first base plate 32. The second gear 52 is in mesh with the first gear 48, and is concentrically fitted with a third gear 54. In this embodiment, the third gear 54 is integral with the second gear 52.

As shown in FIG. 6, the second gear 52 is caused to abut against the other side of the first base plate 32 by the urging force of urging means 55 concentric with the second gear 52. Thus, the coefficient of friction at rotation is increased.

As shown in FIG. 5, an auxiliary retaining member 56 formed of a longitudinally extending lever is disposed near the lower edge of the one side of the first base plate 32, extending parallel thereto. An engaging recess 58 is formed in the upper edge of the rear end portion of the auxiliary retaining member 56. The engaging recess 58 of the auxiliary retaining member 56 faces the engaging recess 38 of the main retaining member 36 with the first base plate 32 between them. Accordingly, the engaging recess 58 of the auxiliary retaining member 56 also overlies the rear end portion of the guide hole 46. The position of the auxiliary retaining member 56 in this state is defined as its first position.

As shown in FIGS. 2, 5 and 6, the rear end of the auxiliary retaining member 56 is engaged with auxiliary retaining member operating means 59 on the front face of the chassis 30.

In this embodiment, the auxiliary retaining member operating means 59 is formed of a lever, the central portion of which is rotatably mounted on the front face of the chassis 30, and one end of which engages the rear end of the auxiliary retaining member 56.

The other end of the lever or the auxiliary retaining member operating means 59, as shown in FIG. 2, engages a pin 61 which is fixed to a lever 60 swingably mounted on the rear face of the chassis 30. The lever 60 also has a pin (not shown), which is rotatably mounted on the rear face of the chassis 30, and is fitted in a guide slot 63 formed in a disk 62 which is rotated through a desired angle by a stepping motor.

The disk 62 shifts its angular position by means of the stepping motor to swing the lever 60. As the lever 60 swings, the auxiliary retaining member operating means 59 shifts its angular position. As the auxiliary retaining member operating means 59 shifts its angular position, the auxiliary retaining member 56 moves between the first position where the engaging recess 58 overlies the guide hole 46, as shown in FIG. 5, and a second position where the engaging recess 58 is kept away from the guide hole 46.

As shown in FIG. 5, an electric switch 64 is located in the locus of backward movement of the upper end portion of the upwardly extending section of the main retaining member 36.

In electric circuit means 65 (FIG. 7), an operating switch 13, an electric switch 64 and a counter are arranged at the input side of a microcomputer which works as a central unit to control those units which are connected thereto. A motor control circuit for driving a reel shaft driving motor 67 and a distributor for driving a stepping motor 66 are arranged at the output side of the microcomputer. The output from the distributor is supplied to the stepping motor 66 through a phase exciting circuit.

The microcomputer outputs a motor driving instruction to the distributor to drive the stepping motor 66 when a specific one of the operating switches 13 is depressed. Then, the distributor generates a driving pulse which is amplified by the phase exciting circuit to drive the stepping motor 66. When the stepping motor 66 is driven, an encoder detects the rotation of the stepping motor 66 and generates a pulse. This output from the encoder is supplied to the counter. When the stepping motor 66 rotates to a certain degree, the microcomputer outputs a motor stopping instruction to stop the stepping motor 66 in accordance with the output from the counter. The rotational direction and angle of the output shaft of the stepping motor 66 are determined by those instructions from the microcomputer which correspond to the depressed one of the operating switches 13. When the stepping motor 66 stops and a magnetic head and a pinch roller are set to specific positions, the microcomputer outputs a motor driving instruction to the reel shaft driving motor 67 through the motor control circuit.

When the switch 64 is closed, no operation is performed by the output from the operating switch 13. The stepping motor 66 rotates counterclockwise so that the auxiliary retaining member 56 is moved again to the first position by the auxiliary retaining member operating means 59. Consequently, a guide pin 80 of a third base plate 78 (see FIG. 9), which has engaged with the engaging recess 38 of the main retaining member 36, engages with the engaging recess 58 of the auxiliary retaining member 56.

The INTEL 8080A unit can be used as a CPU of the microcomputer. The distributor can be constructed by using an exclusive IC made by Sanyo Electric Co., Ltd. or with specific software and the 8080A unit. The encoder can be of an optical type using a slit and a photocoupler. There are various systems which can be used for the motor control circuit, one being a phase detection system using a PLL.

Figure 8:
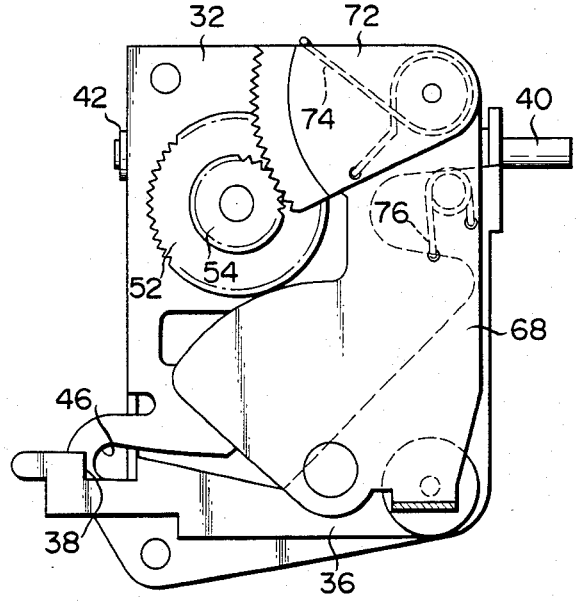
FIG. 8 is a side view on the same side of FIG. 3 showing first and second base plates of the ejecting device and accessories thereof.

As shown in FIG. 8, a flat second base plate 68 is disposed on and along the other side of the first base plate 32. The second base plate 68 is rotatably attached to the upper front end portion of the first base plate 32, and can rotate parallel to the other side of the first base plate 32.

The second base plate 68 has a fan-shaped fourth gear 72 concentrically fixed thereto. The second base plate 68 is urged to rotate counterclockwise by urging means 74 shown in FIG. 8.

The second base plate 68 is coupled with the upwardly extending section of the main retaining member 36 by a toggle spring 76.

The fourth gear 72 is in mesh with the third gear 54.

Figure 9:
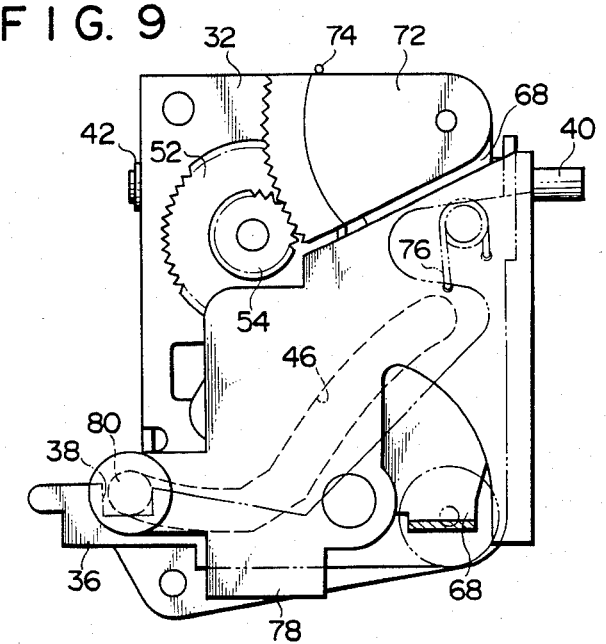
FIG. 9 is a side view on the same side of FIG. 3 showing first, second and third base plates of the ejecting device and accessories thereof.

As shown in FIG. 9, a flat third base plate 78 is also disposed on and along the other side of the first base plate 32. The third base plate 78 is rotatably attached to that portion of the second base plate 68 which is located below the rocking axis of the second base plate 68 on the first base plate 32. The third base plate 78 can rotate parallel to the second base plate 68, that is, to the other side of the first base plate 32.

The third base plate 78 has a guide pin 80 on that portion thereof which is located behind the rocking axis of the third base plate 78 on the second base plate 68. The guide pin 80 is passed through the rear end of the guide hole 46 of the first base plate 32 to engage the respective engaging recesses 38 and 58 of the main and auxiliary retaining members 36 and 56. The positions of the third and second base plates 78 and 68 in this state are defined as their respective first positions.

Figure 10:
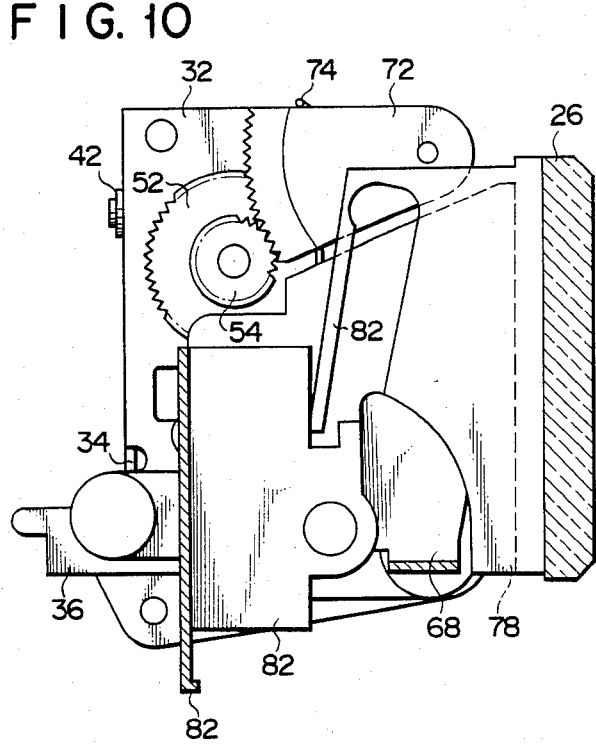
FIG. 10 is a side view on the same side of FIG. 3 showing a state in which tape cassette retaining means is attached to the ejecting device of FIG. 9, and the ejecting device and the second base plate are located in their respective first positions.

As shown in FIG. 10, the third base plate 78 is fitted with tape cassette retaining means 82 for detachably retaining the tape cassette 20. The tape cassette retaining means 82 holds the faceplate 26. When the second and third base plates 68 and 78 are located in their respective first positions, as shown in FIG. 10, the tape cassette retaining means 82 locates the tape cassette 20 held by the retaining means 82 at substantially right angles to the drawing plane of FIG. 3, so that the reel hubs 21 of the tape cassette 20 are mounted individually on the reel shafts 16 and 18 of the magnetic tape driving apparatus, as shown in FIG. 2. At this time, the faceplate 26 is located flush with the front face 10 of the housing of the apparatus, as shown in FIG. 3. The position of the ejecting device 22 in this state is defined as its first position.

Figure 11:
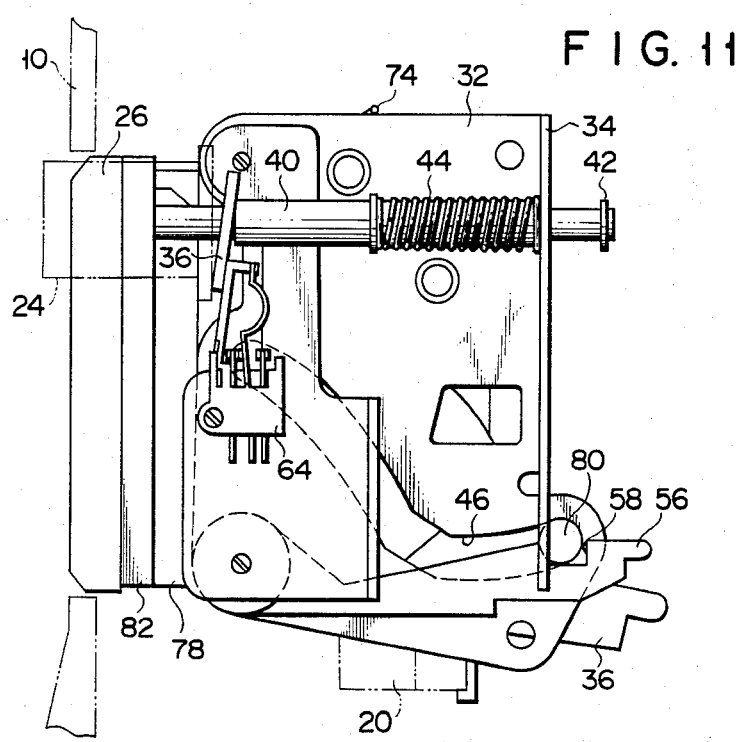
FIG. 11 is a side view on the opposite side to FIG. 3 showing a state in which an ejection switch of the ejecting device of FIG. 3 is depressed and located in its second position.
Figure 12:
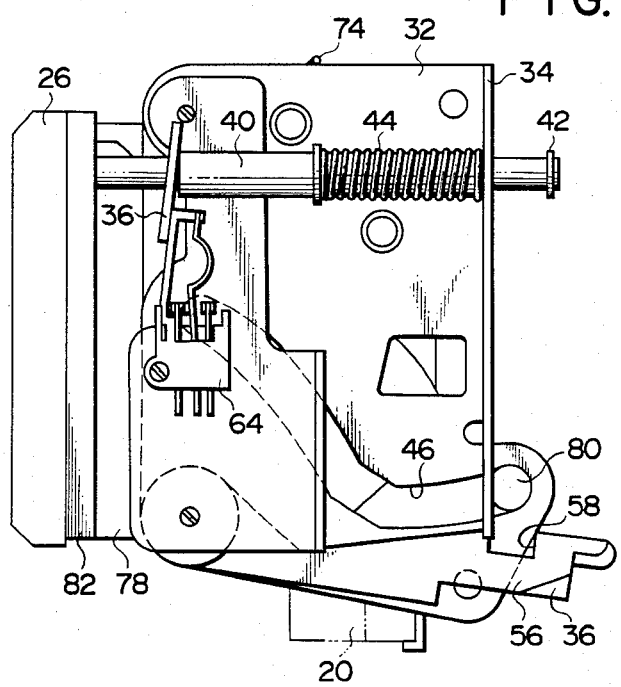
FIG. 12 is a side view on the opposite side to FIG. 3 showing a state in which an auxiliary retaining member of the ejecting device of FIG. 3 is located in its second position.

If the ejection switch 24 of FIG. 1 is depressed and located in its second position, the horizontal shifting member 40 moves backward from its front position against the urging force of the urging means 44, as shown in FIG. 11. Also, the main retaining member 36 rotates in the clockwise direction of FIG. 11 against the urging forces of the urging means 44 and the toggle spring 76 (FIG. 9). Then, the engaging recess 38 of the main retaining member 36 moves away from the guide hole 46 to be disengaged from the guide pin 80.

The positions of the main retaining member 36 and the horizontal shifting member 40 in FIG. 11 are defined as their respective second positions.

Thereupon, the upper end portion of the upwardly extending section of the main retaining member 36 pushes the electric switch 64, as shown in FIG. 11. As a result, only the stepping motor 66 rotates, in one direction, to cause the auxiliary retaining member operating means 59 to locate the auxiliary retaining member 56 in its second position, thereby disengaging the engaging recess 58 of the auxiliary retaining member 56 from the guide pin 80 of the third base plate 78.

The position of the auxiliary retaining member 56 in this state is defined as its second position. This position indicates that an ejection mode is established in the magnetic tape driving apparatus.

Figure 13:
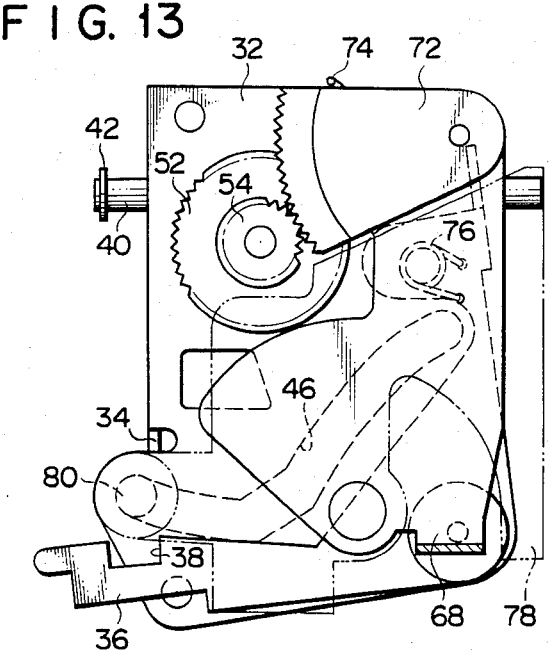
FIG. 13 is a side view on the same side of FIG. 3 excluding the tape cassette retaining means and showing a state in which main and auxiliary retaining members of the ejecting device of FIG. 3 are located in their respective second positions.

When the main retaining member 36 is located in its second position, the toggle spring 76 is located substantially in its neutral position, as shown in FIG. 13.

When the main and auxiliary retaining members 36 and 56 are located in their second positions, the second base plate 68 is rotated in the counterclockwise direction of FIG. 13 by the urging force of the urging means 74. The rotation speed of the second base plate 68 is lowered by frictional force between the first base plate 32 and the first and second gears 48 and 52.

Figure 14:
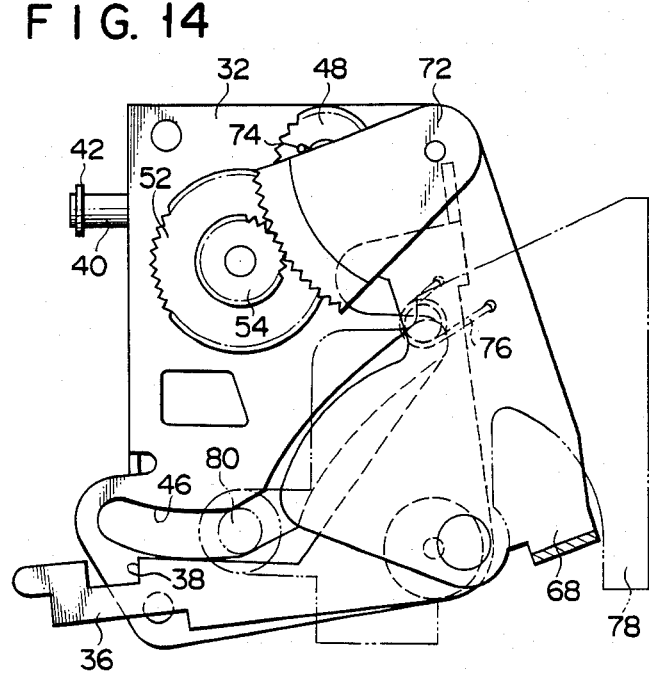
FIG. 14 is a side view on the same side of FIG. 3 excluding the tape cassette retaining means and showing a state in which a guide pin of the third base plate of the ejecting device of FIG. 3 is at the entrance of an intersectional region of a guide hole in the first base plate.

While the guide pin 80 of the third base plate 78 is moved from the rear end of the guide hole 46 of the first base plate 32, as shown in FIG. 13, to the entrance of the intersectional region between the backwardly and upwardly extending sections of the guide hole 46, as shown in FIG. 14, the toggle spring 76 passes its neutral point to keep the main retaining member 36 and the horizontal shifting member 40 in their second positions against the urging force of the urging means 44. After this, the main retaining member 36 and the horizontal shifting member 40 will be maintained in the second positions even though the pressure on the ejection switch 24 of FIG. 1 is removed. This means that the ejection mode will be kept established in the magnetic tape driving apparatus.

Figure 15:
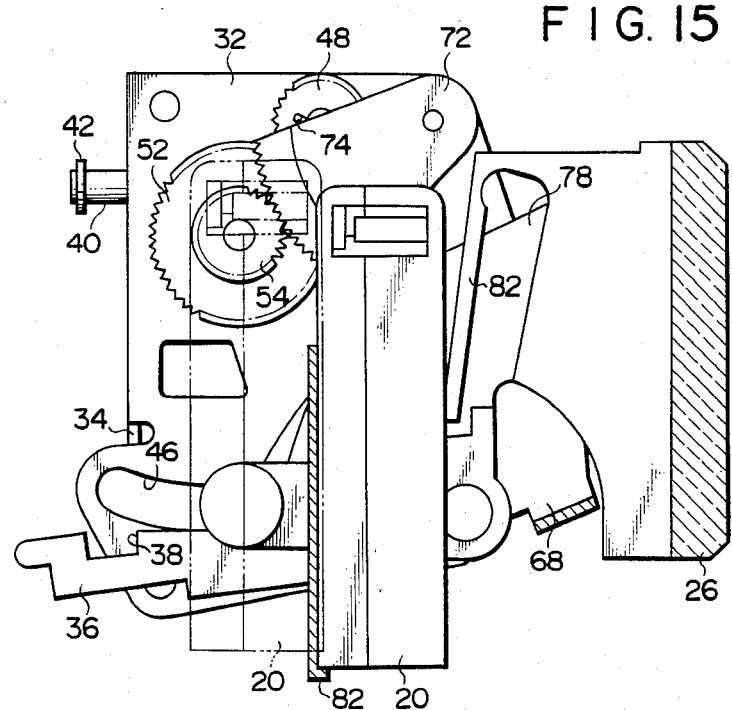
FIG. 15 is a side view on the same side of FIG. 3 showing a state in which the tape cassette retaining means holding the tape cassette is attached to the ejecting device of FIG. 14.

While the guide pin 80 moves from the rear end of the guide hole 46 to the entrance of the intersectional region, the tape cassette 20 held by the tape cassette retaining means 82 is moved parallel from its first position represented by two-dot chain lines in FIG. 15 to the position represented by full lines along the axes of the reel shafts 16 and 18. As the tape cassette 20 is moved parallel in this manner, the reel hubs 21 of the tape cassette 20 are disengaged from the reel shafts 16 and 18 of the magnetic tape driving apparatus.

Figure 16:
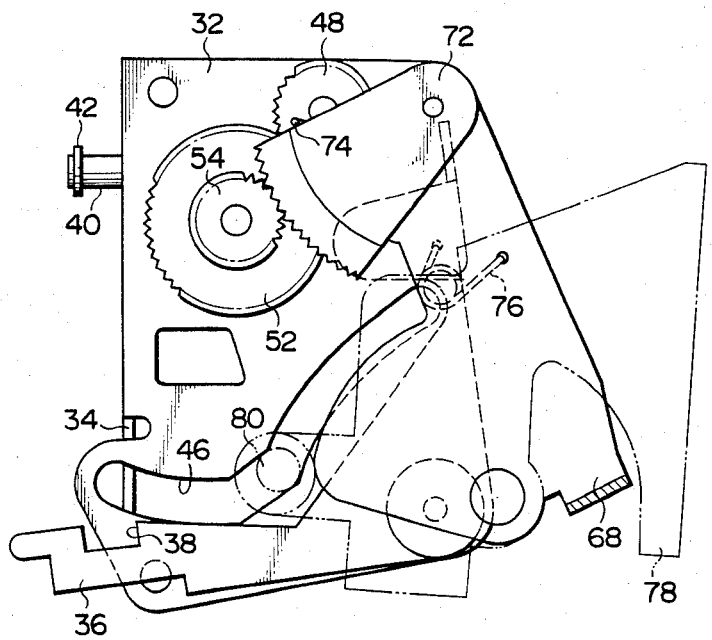
FIG. 16 is a side view on the same side of FIG. 3 excluding the tape cassette retaining means and showing a state in which the guide pin of the third base plate of the ejecting device of FIG. 3 is at the exit of the intersectional region of the guide hole in the first base plate.
Figure 17:
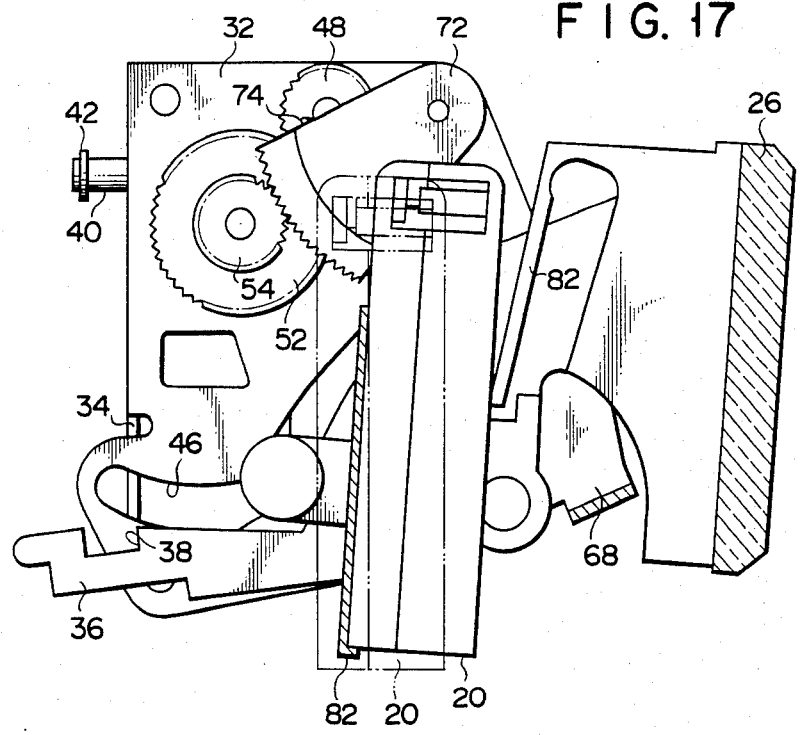
FIG. 17 is a side view on the same side of FIG. 3 showing a state in which the tape cassette retaining means holding the tape cassette is attached to the ejecting device of FIG. 16.

When the guide pin 80 of the third base plate 78 reaches the exit of the intersectional region of the guide hole 46 of the first base plate 32, as shown in FIG. 16, the third base plate 78 is tilted slightly forward. Accordingly, the tape cassette 20 held by the tape cassette retaining means 82, as shown in FIG. 17, is tilted forward to a little greater degree as compared with the case where the guide pin 80 is located at the entrance of the intersectional region of the guide hole 46. This indicates that the axes of the reel hubs 21 of the tape cassette 20 are tilted relative to the axes of the reel shafts 16 and 18 of the magnetic tape driving apparatus.

Figure 18:
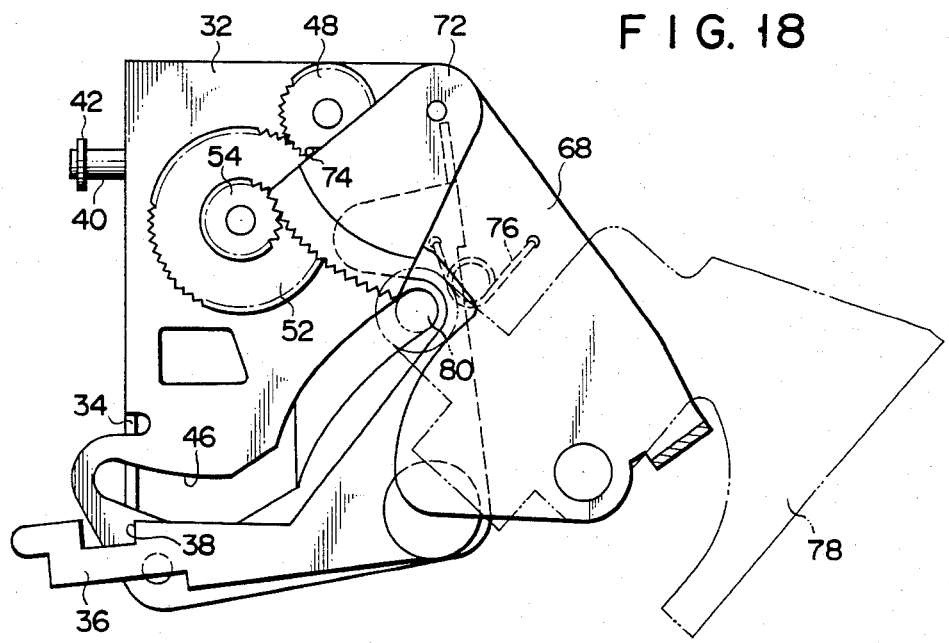
FIG. 18 is a side view on the same side of FIG. 3 excluding the tape cassette retaining means and showing a state in which the guide pin of the third base plate of the ejecting device of FIG. 3 is at the front end of an upwardly extending section of the guide hole in the first base plate, and the second base plate and the ejecting device are located in their respective second positions.

While the guide pin 80 of the third base plate 78 moves from the exit of the intersectional region of the guide hole 46 of the third base plate 32, as shown in FIG. 16, to the front end of the upwardly extending section of the guide hole 46, as shown in FIG. 18, the third base plate 78 is tilted further forward.

The position of the second base plate 68 in this state is defined as its second position.

When the second base plate 68 is located in its second position, that portion of the second base plate 68 which is located below the axis of rotation of the second base plate 68 relative to the first base plate 32 is separated farther from the projected ends of the reel shafts 16 and 18 than when the second base plate 68 is located in its first position, as shown in FIG. 13. The tape cassette 20 held by the tape cassette retaining means 82, as indicated by full lines in FIG. 19, is tilted further as compared with the case where the guide pin 80 is at the exit of the intersectional region of the guide hole 46 and the tape cassette 20 is in the position represented by two-dot chain lines. Thereupon, the tape cassette 20 held by the tape cassette retaining means 82 is exposed to the outside space through the front face 10 of the housing of the magnetic tape driving apparatus. The position of the ejecting device 22 in this state is defined as its second position. The tape cassette 20 is removed from the tape cassette retaining means 82 as it moves off to the upper right of FIG. 19.

While the second base plate 68 moves from its first position shown in FIG. 13 to its second position shown in FIGS. 18 and 19, that is, while the ejecting device 22 is shifted from its first position to its second position, the fourth gear 72 on the second base plate 68 is in mesh with the third gear 54. Accordingly, the second base plate 68 is moved smoothly from its first position to its second position at a relatively low speed by the urging force of the urging means 74 as well as by the frictional force between the first base plate 32 and the first and second gears 48 and 52. Also, the ejecting device 22 is smoothly shifted from its first position to its second position at a relatively low speed. Such smooth shifting of the ejecting device 22 will never produce any substantial crashing sound. Where the magnetic tape driving device is a cassette deck, therefore, it will be able to finish a playback operation quietly.

The tape cassette 20 which is separated from the tape cassette retaining means 82 can be set therein by inserting the tape cassette 20 toward the lower left of FIG. 19, that is, in the opposite direction to the aforesaid direction.

The ejecting device 22, which is located in its second position shown in FIG. 19 as the second base plate 68 is located in its second position, is relocated in its second position shown in FIG. 4 after successively going through the positions shown in FIGS. 19, 17 and 15 by pushing the faceplate 26 backward. The processes of such relocation are directly opposite to the processes of shifting the ejecting device 22 from its first position to its second position.

While the guide pin 80 of the third base plate 78 moves from the entrance of the intersectonal region to the rear end of the backwardly extending section of the guide hole 46, the toggle spring 76 returns to its neutral point. When the guide pin 80 reaches the rear end of the backwardly extending section, the main retaining member 36, along with the horizontal shifting member 40, is returned to its first position by the urging force of the toggle spring 76 and the urging means 44. Thus, the guide pin 80 of the third base plate 78 is caused to engage the engaging recess 38 of the main retaining member 36 to keep the second base plate 68 in its first position.

As the main retaining member 36 returns to its first position, the electric switch 64 is shifted to the position represented in FIG. 5. As a result, the electric circuit means 65 makes only the stepping motor 66 rotate in the other direction, to cause the auxiliary retaining member operating means 59 to return the auxiliary retaining member 56 to its first position. Thus, the engaging recess 58 of the auxiliary retaining member 56 is caused to engage the guide pin 80 of the third base plate 78 which has previously been engaged with the engaging recess 38 of the main retaining member 36.

In the ejecting device 22 of the magnetic tape driving apparatus according to the one embodiment of this invention, as described in detail herein, the faceplate 26 describes a locus indicated by a dashed line in FIG. 20 as the ejecting device 22 is shifted from its first position to its second position. In this embodiment, the tape cassette 20 detachably held by the ejecting device 22 is arranged so that those two faces of its housing which support the reel hubs 21 for rotation are arranged parallel to the faceplate 26. Accordingly, the tape cassette 20 describes the same locus of the faceplate 26 shown in FIG. 20.

The tape cassette 20 held by the tape cassette retaining means 82 has its reel hubs 21 engaged with the reel shafts 16 and 18 of the magnetic tape driving apparatus when the second base plate 68 and the ejecting device 22 are located in their respective first positions. While the ejecting device 22 is shifted from its first position to its second position as the second base plate 68 moves from its first position to its second position, the tape cassette 20 moves along the axes of the reel shafts 16 and 18 to disengage its reel hubs 21 from the reel shafts 16 and 18, and then tilts forward to incline the axes of the reel hubs 21 relative to those of the reel shafts 16 and 18.

According to this embodiment, moreover, the height of the faceplate 26 of the ejecting device 22 is shorter than the height of the tape cassette 20, and the operation switches 12 and 13 are located right under the faceplate 26 so that their orthogonal projection overlaps the tape cassette 20 whose reel hubs 21 are mounted on the reel shafts 16 and 18. Further, the thickness of the magnetic tape driving apparatus is substantially equal to the vertical length of the housing of the tape cassette 20. Despite all these conditions, the tape cassette 20 detachably held by the ejecting device 22 can be moved between its first position where its reel hubs 21 are mounted on the reel shafts 16 and 18, and its second position where the reel hubs 21 are disengaged from the reel shafts 16 and 18 and the axes of the reel hubs 21 are tilted relative to those of the reel shafts 16 and 18 to project the housing of the tape cassette 20 into the outside space.

Figure 7:
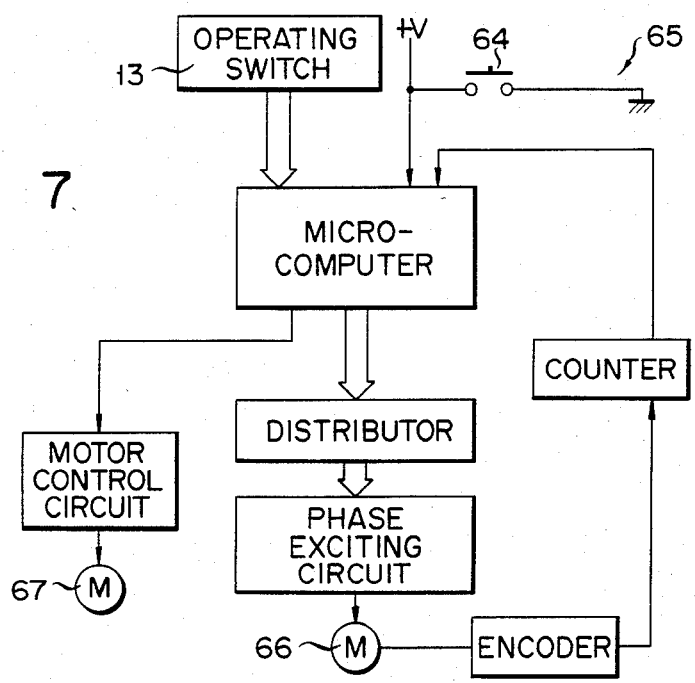
FIG. 7 is an electric circuit diagram showing the principal part of electric circuit means of the ejecting device of thE embodiment.

In the ejecting device 22 of the magnetic tape driving apparatus according to the aforementioned embodiment of this invention, furthermore, the electric circuit means 65 is arranged as shown in FIG. 7. Therefore, even if the magnetic tape driving mode setting switch or switches 13 are located in their second positions by mistake while the ejecting device 22 is being shifted between its first and second positions as the ejection switch 24 is located in its second position, the reel shafts 16 and 18 will never rotate.

Although an illustrative embodiment of this invention has been described in detail herein with reference to the accompanying drawings, it is to be understood that the invention is not limited to that embodiment, and that various changes and modifications may be effected therein by one skilled in the art without departing from the scope or spirit of the invention.

What is claimed is:

1. An ejecting device for use in a magnetic tape driving apparatus of the kind having a rising surface relative to a horizontal plane, reel shafts having projected ends and whose axes intersect the riding surface, a magnetic tape driving mode setting switch movable between a first position where the reel shafts are stopped and a magnetic tape driving mode is cleared and a second position where the reel shafts are set for rotation and the magnetic tape driving mode is established, and an ejection switch movable between first and secodd positions, wherein said ejecting device can move between a first position where reel hubs of a tape cassette held in the ejecting device in a holding space inside said tape driving apparatus are mounted on the projected ends of the reel shafts, and a second Position where the reel hubs are disengaged from the reel shafts and the tape cassette is outside the holding space, and said device is arranged to move from its first position to the second position as the ejection switch held in the first position thereof is shifted to its second position, said ejecting device comprising:

a first base plate arranged to extend parallel to the axes of the reel shafts and to intersect the horizontal plane;

a second base plate attached to the first base plate so as to be rotatable substantially parallel to the first base plate between first and second positions, so that a lower portion of the second base plate below its axis of rotation relative to the first base plate is farther away from the projected ends of the reel shafts when the second base plate is located in its second position than when in the first position;

a third base plate rotatably attached to that portion of the second base plate below the axis of rotation of the second base plate relative to the first base plate, and arranged for rotation substantially parallel to the second base plate;

tape cassette retaining means on the third base plate for detachably holding the tape cassette;

said retaining means including a face plate for providing a covering surface for the holding space inside the tape driving apparatus when the second base plate is located in its first position, the vertical length of said face plate being less than the corresponding vertical length of the tape cassette to be held by a part of said retaining means;

a guide pin on the third base plate; and the first base plate having a guide hole in which the guide pin is fitted, so that the reel hubs of the tape cassette held by the tape cassette retaining means are mounted on the reel shafts when the second base plate is located in its first position, and that the reel hubs of the tape cassette held by the tape cassette retaining means are disengaged from the reel shafts to tilt the axes of the reel hubs relative to the axes of the reel shafts while the second base plate moves from its first position to the second position.

2. An ejecting device according to claim 1, which further comprises:

an auxiliary retaining member arranged to be movable between first and second positions in said tape driving apparatus, said auxiliary retaining member holding the guide pin to keep the second base plate in the first position thereof when the auxiliary retaining member is located in the first position thereof, and releasing the hold of the guide pin to allow the second base plate to move from the first position thereof to the second position when the auxiliary retaining member is located in the second position thereof; and auxiliary retaining member operating means arranged to be operated by the magnetic tape driving mode setting switch to shift the auxiliary retaining member between the first and second positions thereof, so that the auxiliary retaining member is located in the first position thereof when the magnetic tape driving mode setting switch is located in the second position thereof, and that the auxiliary retaining member is located in the second position thereof when the magnetic tape driving mode setting switch is located in the first position thereof, and wherein said ejection switch includes a main retaining member for holding the guide pin to keep the second base plate in the first position thereof when the main retaining member is located in a first position thereof and releasing the hold of the guide pin to release the second base plate from the locking to the first position thereof when the main retaining member is located in the second position thereof.

3. An ejecting device according to claim 2, which further comprises:

a toggle spring coupled with the ejection switch and the second base plate to urge the ejection switch toward the first position thereof as the second base plate is located in the first position thereof and to urge the ejection switch toward the second position thereof as the second base plate moves from the first position thereof to the second position; and electric circuit means for electrically preventing the magnetic tape driving mode from beig established in the magnetic tape driving apparatus by the magnetic tape driving mode setting switch as the ejection switch is located in the second position thereof.

4. An ejecting device according to claim 3, wherein:
said ejection switch includes a horizontal shifting member movable between first and second positions thereof in a direction to intersect the rising surface of the tape driving apparatus along the first base plate, and located closer to the rising surface when in the second position thereof;

said main retaining member is a lever having an engaging recess at one end to engage the guide pin, rotatably coupled with the horizontal shifting member at the other end, and rotatably attached at the middle portion thereof to the first base plate, so that said lever is located in the first position thereof as the horizontal shifting member is located in the first position thereof, and makes an angular movement from the first position thereof to be located in the second position thereof as the horizontal shifting member is located in the second position thereof; and said toggle spring is coupled with the other end of the lever forming the main retaining member of the ejection switch and the second base plate of the ejecting device.

5. An ejecting device according to claim 4, wherein said auxiliary retaining member is a lever rotatably attached at one end to the first base plate so as to be concentric with the main retaining member, having an engaging recess at the other end to engage the guide pin, and making an angular movement between first and second positions thereof.

6. An ejecting device according to claim 1. which further comprises:
a toggle spring coupled with the ejection switch and the second base plate to urge the ejection switch toward the first position thereof as the second base plate is located in the first position thereof and to urge the ejection switch toward the second position thereof as the second base plate moves from the first position thereof to the second position; and electric circuit means for electrically preventing the magnetic tape driving mode from being established in the magnetic tape driving apparatus by the magnetic tape driving mode setting switch as the ejection switch is located in the second position thereof.

* * * * *

UNITED STATES PATENT AND TRADEMARK OFFICE
CERTIFICATE OF CORRECTION

PATENT NO. : 4,509,085
DATED : April 2, 1985
INVENTOR(S) : Shoichi SAITO

It is certified that error appears in the above-identified patent and that said Letters Patent is hereby corrected as shown below:

In the Abstract, line 10, after "first position", " , " should read -- . --; and "a" should read --A--;

Column 3, line 13, after "second positions", the word "thereof" should be deleted;

Column 4, line 21, after "located in", change "the" to --its--;

Column 13, line 40, change "secodd" to --second--;

Column 13, line 45, change "Position" to --position--;

Column 14, line 64, change "beig" to --being--.

Signed and Sealed this

Thirty-first Day of December 1985

[SEAL]

Attest:

DONALD J. QUIGG

Attesting Officer

Commissioner of Patents and Trademarks